US006877096B1

(12) United States Patent
Chung et al.

(10) Patent No.: US 6,877,096 B1
(45) Date of Patent: Apr. 5, 2005

(54) MODULAR COMPUTER APPLICATIONS WITH EXPANDABLE CAPABILITIES

(76) Inventors: Edward J. Chung, 263 Cherry St., Newton, MA (US) 02465-1607; Hollis M. Schuler, 450 S. Geronimo St., Unit 201, Destin, FL (US) 32541

( * ) Notice: Subject to any disclaimer, the term of this patent is extended or adjusted under 35 U.S.C. 154(b) by 0 days.

(21) Appl. No.: 09/546,758

(22) Filed: Apr. 11, 2000

(51) Int. Cl.$^7$ ................................................. H04K 1/00
(52) U.S. Cl. ..................... 713/185; 713/200; 713/158; 463/43; 463/29; 380/251
(58) Field of Search ................................ 713/185, 158, 713/200; 463/43, 29, 44; 380/251

(56) References Cited

U.S. PATENT DOCUMENTS

| | | | | |
|---|---|---|---|---|
| 4,596,390 A | * | 6/1986 | Studley ........................ | 463/47 |
| 4,799,258 A | * | 1/1989 | Davies ......................... | 713/159 |
| 4,858,930 A | | 8/1989 | Sato ............................ | 273/85 G |
| 4,959,861 A | * | 9/1990 | Howlette ...................... | 713/200 |
| 5,210,795 A | * | 5/1993 | Lipner et al. ................. | 713/187 |
| 5,451,053 A | | 9/1995 | Garrido ..................... | 273/148 B |
| RE35,520 E | | 5/1997 | Darling et al. ................ | 463/45 |
| 5,662,332 A | | 9/1997 | Garfield ....................... | 273/308 |
| 5,689,561 A | | 11/1997 | Pace ............................ | 380/4 |
| 5,717,938 A | | 2/1998 | Garthwaite et al. ......... | 395/751 |
| 5,759,100 A | | 6/1998 | Nakanishi ..................... | 463/37 |
| 5,779,549 A | | 7/1998 | Walker et al. ................ | 463/42 |
| 5,785,598 A | | 7/1998 | Hsu ............................. | 463/44 |
| 5,984,785 A | | 11/1999 | Takeda et al. ................ | 463/38 |

\* cited by examiner

*Primary Examiner*—Gregory Morse
*Assistant Examiner*—Jacob Lipman
(74) *Attorney, Agent, or Firm*—Cesari and McKenna, LLP

(57) ABSTRACT

The range of functionality of a variable-capability computer application, such as a game, is determined by physical tokens introduced into a device connected to the computer. The application may operate in accordance with instructions downloaded to the computer via a computer network, and the capabilities embodied in those instructions are determined by the physical tokens.

15 Claims, 3 Drawing Sheets

MODULAR COMPUTER APPLICATIONS WITH EXPANDABLE CAPABILITIES

FIELD OF THE INVENTION

The present invention relates to computer application programs, such as games, and in particular to applications involving variable capabilities.

BACKGROUND OF THE INVENTION

Home video games typically take the form of a game console having player controllers and on-board processing capacity. The identity and capabilities of a particular game may be determined by a cartridge that is inserted into the console. The cartridge contains instructions implementing the game action, while the generic tasks of image rendering and three-dimensional (3D) graphics are performed by the console hardware. Thus, the user's game experience depends on the selected cartridge. As might be expected, more expensive cartridges confer greater capability.

Video games have also been developed for play on home computers. Many games, like their console-based counterparts, are available in different versions with differing capabilities. Each version corresponds to a different executable file, which the user purchases and installs on his computer. To upgrade to a higher version, the user either purchases a new executable file or an upgrade, which may be self-executing so as to modify the original file to incorporate enhanced features.

These approach all involve a range of choices this fixed by the suite of game versions currently available, and require the user to undertake an exchange of hardware or software—typically accompanied by payment of a fee—to the extent a change in capabilities is desired. This makes it cumbersome to "mix and match" capabilities or to vary them from game to game.

DESCRIPTION OF THE INVENTION

Brief Summary of the Invention

The present facilitates implementation of a variable-capability computer application, such as a game, whose range of functionality is determined by physical tokens introduced into a special device. In general, the application operates in accordance with instructions downloaded via a computer network or from physical media such as a floppy or hard disk, CD-ROM or DVD, and the content of these instructions is determined by the identity and/or number of tokens in the device. The instructions may be downloaded onto or activated within a client computer connected to the device. The functionality of the application, as determined by the tokens, is implemented on the client computer.

Thus, in a game application, the user may vary the game capabilities by selecting an appropriate combination of tokens. Because the tokens themselves may have shapes or design work indicative of the capabilities to which they correspond, their use is intuitive, and a particular set of desired capabilities readily selected.

The manner in which tokens determine functionality depends on the chosen implementation. In one approach, the downloaded or stored application instructions may constitute a complete, executable program that embodies the entire application functionality. Reader circuitry within the device obtains data from the tokens that will determine the capability level to which the user is entitled. This data is transmitted, via a computer network, to a server, which interprets the data and utilizes this information to assemble or select the appropriate executable file(s). The server sends the file(s) via the computer network to the client computer for execution thereon.

In a related approach, all potential functionality for the application is stored as a "superset" of instructions on a computer (or on a device accessible to the computer). The tokens determine functionality by allowing the computer to access discrete files or portions of the application program; the greater the number of tokens, the more features the computer will be capable of executing. In this case, there is no physical distribution of processing between a client machine and a remote server.

Alternatively, the application may be executed primarily on a remote server, with processing results transmitted as web pages to a browser operative on the client computer. In this case, the tokens determine the manner in which the server-based application is executed.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
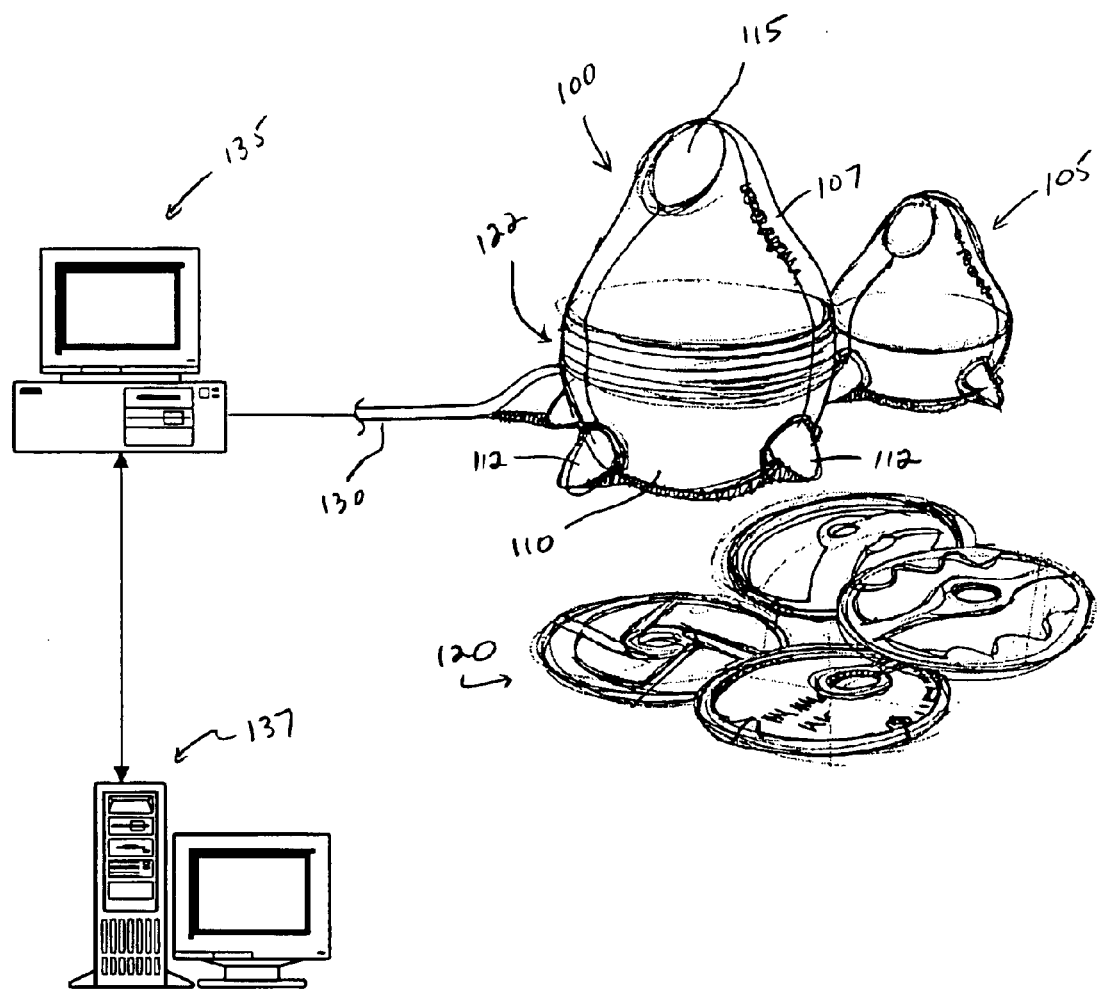
FIG. 1 is a partially schematic view of a representative system embodying the invention.

Two representative devices 100, 105 in accordance with the invention are shown in FIG. 1. Each device includes a top body portion 107 and a bottom body portion 110, which are separable from each other and may be fabricated from plastic or other suitable material. When top and bottom portions 107, 110 are joined as shown in FIG. 1, the device 100, 105 assumes a pear-like shape; top portion 107 may simply rest against bottom portion 110, or they may fit together by means of a rim-and-flange arrangement (not shown), whereby the bottom surface of portion 107 is formed into a flange that nests within a rim formed around the upper surface of bottom portion 110. A series of feet 112 project from bottom portion 110 to allow the device 100, 105 to rest stably on a horizontal surface. Top portion 107 includes a display device 115.

One or more tokens in the form of discs, representatively illustrated at 120, may be placed on the upper surface of bottom body portion 110 to form a stack 122 (if desired, the discs 120 may stack using a rim-and-flange arrangement as set forth above). Discs 120 contain data readable by circuitry within device 100, 105 as discussed below. Top body portion 107 is placed on top of stack 112 so that discs 120 reside within the housing formed by body portions 107, 110, and the overall shape of the device 100 and its horizontal stability are not meaningfully altered.

A cable 130 connects the device 100, 105 to a computer 135, and the device determines the capabilities of an interactive application executing on the computer. In one embodiment of the invention, computer 135 is a "client" computer connected, via a computer network, to a "server" computer 137 as discussed below. This form of distributed architecture contemplates a powerful workstation or mainframe computer acting as the server 137, whose primary function is to service the requests of a large number of smaller computers, or clients, which connect to it. These computers may be personal or laptop computers, or game consoles. The network connection between client 135 and server 137 may involve a local-area network (LAN), a wide-area network (WAN), or the Internet—the worldwide "network of networks" that links millions of computers through tens of thousands of separate (but intercommunicating) networks.

The Internet supports a large variety of information-transfer protocols. The World Wide Web (hereafter simply the "web") represents one of these. Web-accessible information is identified by a uniform resource locator or "URL," which specifies the location of the file in terms of a specific computer and a location on that computer. Typically, a URL has the format http:\\<host>\<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

Figure 2:
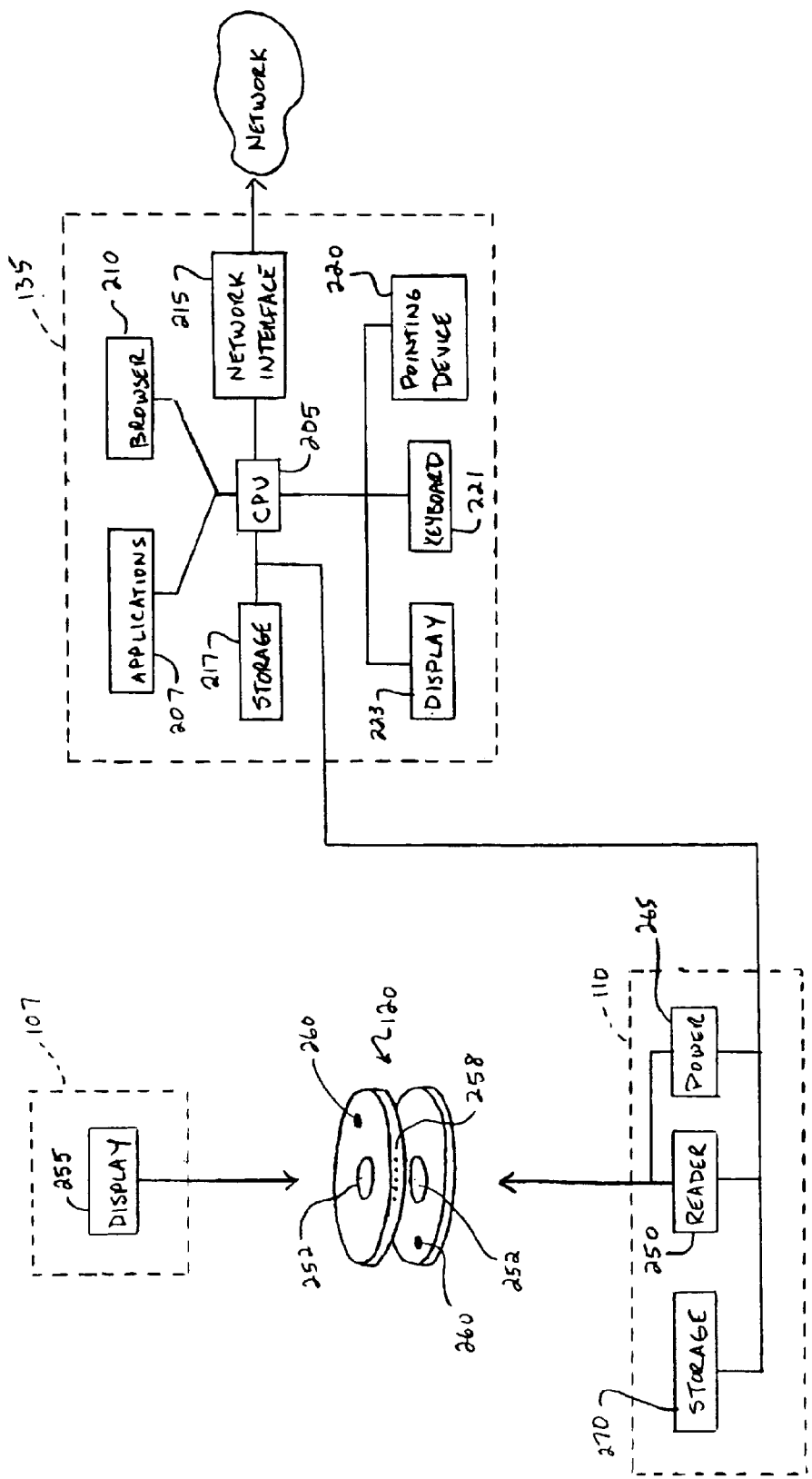
FIG. 2 schematically illustrates the primary operative components of the embodiment depicted in FIG. 1.

Web functionality is typically implemented on the client machine via a web browser. As shown in FIG. 2, the client computer 135 may be realized as a personal computer game console having a central processing unit (CPU) 205, which supports execution of applications 207 running as active processes on computer 135. One such application is a web browser 210, which controls the content presented on a display in accordance with downloaded web pages. A network interface 215 connects, generally via telephone dial-up, to a gateway or other Internet access provider. As a result, the client machine 135 becomes a node on the Internet, capable of exchanging data with other Internet computers.

With client 135 connected as an Internet node (or to any server implementing http) via network interface 215, the browser 210 utilizes URLs to locate, fetch and display the specified documents. "Display" in this sense can range from simple pictorial and textual rendering to real-time playing of audio and/or video segments.

Computer 135 also contains various conventional components, i.e., system storage 217 (including volatile random-access memory and non-volatile storage in the form, for example, of a hard disk), an operating system and a graphical user interface (not shown), a position-sensing device 220 (e.g., a mouse or, in a game-playing environment, a joystick) and, if appropriate, a keyboard 221 for accepting input. The output of either device can be used to designate information or select particular areas of a screen display 223, on which the user interface and visual aspects of applications 207 appear.

With continued reference to FIG. 2, bottom body portion 110 (shown schematically) includes a reader 250 capable of acquiring the identifying indicia stored on or within discs 120. The reader 250 can take any of various forms, depending on the format in which the indicia are stored, and typically draws power from computer 135 via cable 130. In one approach, discs 120 contain devices that impart information by magnetic coupling. For example, radio frequency identification (RFID) devices have been employed for some time to remotely sense parameters of interest in people or objects.

Reader 250 generates a time-varying interrogation signal, which interacts with the RFID devices embedded in discs 120 to obtain data therefrom. Typically, each disc 120 will contain an RFID device responsive to a different frequency, and reader 250 sweeps through a band of frequencies to determine which discs are present. The interrogated signal, as modulated by the RFID devices, is sent to CPU 205 (via cable 130, see FIG. 1) as a pulse train. This is decoded by a program running on computer 135 or on server 137.

Similarly, discs 120 may contain identifying circuitry that is electrically, rather than magnetically coupled. In this case, the top and bottom surfaces of discs 120 each have one or more metal contacts 252 thereon, which electrically couple the discs 120 when stacked. Reader 250 is electrically coupled to the bottom contact of the bottom disc, and can therefore communicate electrically with all discs in the stack. For example, the discs can be formed of a dielectric material, and contacts 252 may each contain a central portion and a surrounding annular portion spaced slightly therefrom. Current flows from reader 250 into one of the contacts, propagates through the set of congruent contacts of the other discs (and through the identifying circuitry in the discs), and returns to reader 250 by propagating through the other set of congruent contacts. This arrangement also facilitates convenient provisional of electrical power to a display element 255 within top body portion 107, which bridges the topmost contacts to complete the circuit. Indeed, the edge of one or more of discs 120 may itself have a display element 258 powered by reader 250.

Alternatively, the indicium may be optically detectable. For example, discs 120 may be translucent with holes or opaque markings 260 (or other optically detectable features) at characteristic locations. An optical reader 250 determines the locations of the features in stack 122 (see FIG. 1) by recording the pattern of transmission intensities through the stack, and sends data representative of the pattern to CPU 205 for interpretation (or direct transmission to server 137). In still another alternative, the indicium 260 is a barcode printed on the surfaces of discs 120, and a barcode reader 250 is utilized to scan these. In this embodiment, it may be preferable to configure the body of the device as a single unit with a slot through which discs 120 are sequentially inserted. Each time a disc is inserted, its barcode 260 is scanned by reader 250, and the disc falls onto a recessed surface (or onto discs previously inserted).

It should also be stressed that display elements 255, 258 may be employed regardless of the type of reader 250 employed. Power for the displays may originate with computer 135 and be provided via the system of electrical contacts described, or may instead derive from batteries or another external power source 265.

The invention may operate in any of various ways to determine the capabilities of an interactive application 207. In one approach, the application originates with the server 137 as an executable file (or files) transferred to (i.e., downloaded by) client 135 via network interface 215. The application is stored in storage 217 and is launched, and operated, by the user by means of pointing device 220 and/or keyboard 221. The application may be, for example, an interactive game, a database retrieval system, electronic commerce system, or other application involving user interactivity.

Upon introduction of discs 120 within the device 100, reader 250 determines their identities and issues a signal indicative of these to CPU 205. This information is sent to server 137 via the computer network. Upon receipt of the information, server 137 consults a database to determine the capability level to which the client user is entitled based on the number and identity of the discs in the device 100. For example, in a game context, each disc may correspond to a different weapon; the more discs that have been introduced, the more weapons to which the player will have access. In a database context, the application may be a search engine with each disc corresponding to a separate database; a search query entered by the user will be applied only to those databases corresponding to the discs.

Based on the disc information, server 137 prepares the application file(s) and effects transfer to client 135. Display 255 may be activated to indicate successful completion of the transfer, signaling that the file is ready for use. Display 258 may be activated by computer 135 during use of the application as appropriate.

In a second approach, the application is processed at least in part on server 137, with interim processing results transmitted as web pages to browser 210 operative on the client computer 135. In accordance with this approach, the application may be as simple as a single web page. For example, in the database-search context, the web page may be an interactive form that permits the user to enter a search query into a data field. The web page shows the databases to which the search will be applied, and contains invisible embedded codes designating these. When the user clicks a "submit" button on the page, the search query and embedded codes are transmitted back to server 137, which executes the search (e.g., by means of a CGI application) and returns the results to client 135 as another web page.

In more elaborate versions, a game is played with server 137 (or with other client users connected to server 137) via the Internet—i.e., by means of one or more web pages downloaded to client 135 or using a proprietary Internet game application (which need not, for example, utilize http). In the case of web pages, each page will typically have interactive game functionality associated with it, e.g., in the form of an "applet." These are stand-alone programs embedded within web pages that can interact with the user locally, display moving animations and perform other functions on browsers having an appropriate interpreter. The applet is transferred to the browser along with other web-page information and is executed by the interpreter; the data acted upon by the applet can be located on the same or a different web page, or a different server entirely, since applets can themselves cause the browser to retrieve information via hypertext links. Once again, the capabilities of the web page(s) and embedded applets are determined by the discs in device 100.

Figure 3:
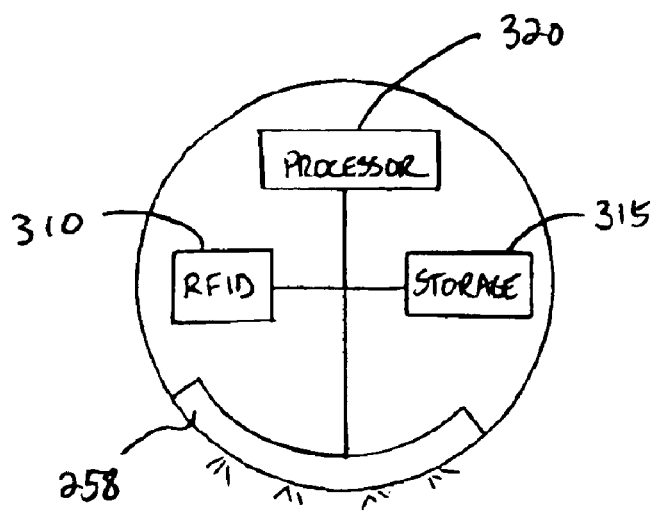
FIG. 3 schematically illustrates the contents of a representative function-determining token.

If desired, discs 120 can also be configured to store the executable application file, the URL of the appropriate application web page, and/or information relevant to the progress of play. As shown in FIG. 3, a disc 120 may include an RFID or electrically coupled chip 310 and a storage device 315. Storage device 315 is ordinarily a non-volatile device such as a Flash ROM, EPROM or the like. Although the contents of storage device 315 (and, for that matter, display 258) are generally entered and read by client computer 135, it is also possible to include a microprocessor 320 in disc 120 to deliver additional functionality. For example, microprocessor 320 may act as a co-processor (e.g., a 3D graphics-generating device) to improve the speed of execution or enhance the visual appearance of the downloaded application, thereby transforming device 100 into the equivalent of a game console.

Memory 315 may be used to store data representative of the current state of play should the user interrupt a game, enabling the user to resume the action at a subsequent time. Moreover, each disc may store separate data relevant to the application capability it represents. For example, suppose a particular disc 120 corresponds to a missile launcher. The missile launcher initially contains a particular quantity of missiles, and as the user fires these in the course of play, the contents of a memory register is decremented in the disc's storage device 315. When the user resumes play, the number of remaining of missiles stored in memory 315 is transferred to the application program or to a web page in order to facilitate resumption of the action. Similarly, other discs representing different weapons or capabilities store information particular thereto, and the information is also accessed when play is resumed.

In another alternative, the functions of memory 315 may be performed by an analogous storage device 270 located in bottom body portion 110 (see FIG. 2).

In a second embodiment of the invention, complete application functionality is present on (or directly accessible to) computer 135 by means of a storage device 217. Discs 120 determine the degree of functionality or features to which the user is accorded access—i.e., which portions of the full application program will be executable by CPU 205. For example, each disc 120 can "unlock" files, subroutines, or other program elements stored on a CD-ROM, allowing their transfer to system memory and subsequent execution. Of course, the manner in which functionality is actually stored and enabled is not critical; what is of importance is the ability to utilize discs 120 to determine overall application functionality in a modular fashion.

It should be stressed that the approach illustrated in FIG. 1 is representative only, and that numerous alternative designs are possible. For example, the device may be realized as the game control itself, and include the joystick or other control device that governs play. Alternatively or in addition, the design of the device and the tokens may correspond to the nature of the application. For example, the device may take the form of a racing car, and the tokens may represent parts of the car and be separately affixable thereto. In this way, the user may choose the size and type of the engine, wheels, etc., with greater capabilities associated with visually more impressive tokens.

Although the present invention has been described with reference to specific details, it is not intended that such details should be regarded as limitations upon the scope of the invention, except as and to the extent that they are included in the accompanying claims.

What is claimed is:

1. For use in conjunction with a computer having means for accessing and executing instructions stored on a computer-readable medium, the instructions, when executed, (i) causing presentation of an interactive application thereon and (ii) determining capabilities of the application, a modular device comprising a housing having circuitry interactive with the computer, the housing being adapted to receive physical tokens therein, the tokens governing the instructions executed by the computer so as to determine the capabilities of the application; and wherein the tokens are each in the form of a disc combinable with other such discs within the housing.

2. For use in conjunction with a computer having means for accessing and executing instructions stored on a computer-readable medium, the instructions, when executed, (i) causing presentation of an interactive application thereon and (ii) determining capabilities of the application, a modular device comprising a housing having circuitry interactive with the computer, the housing being adapted to receive physical tokens therein, the tokens governing the instructions executed by the computer so as to determine the capabilities of the application, wherein the computer further comprises circuitry for causing establishment of a network communication to a server, the stored instructions further causing download and storage of instructions from the server via the network connection, the downloaded instructions determining the capabilities of the application; and further comprising a plurality of the tokens, the tokens being combinable and collectively determining the instructions downloaded from the server.

3. The device of claim 2 wherein the tokens are in the form of discs having first and second faces and a surrounding edge, the edge of one of the tokens comprising a visual display.

4. The device of claim 2 wherein each token has a unique indicium assigned thereto and readable therefrom, the housing further comprising circuitry for reading the indicia and communicating them to the computer for transmission to the server to determine the downloaded instructions.

5. The device of claim 4 wherein each token comprises an RFID indicium, the reading circuitry comprising an RFID reader.

6. The device of claim 4 wherein the housing is adapted to permit insertion of the tokens therein, the circuitry reading the indicia as the tokens are inserted.

7. The device of claim 6 wherein each token comprises an optically readable indicium, the reading circuitry comprising an optical reader.

8. The device of claim 5 wherein the housing comprises first and second mating portions, tokens being received between the first and second portions.

9. The device of claim 5 wherein the application causes presentation of an interactive game playable on the computer in accordance with the instructions.

10. A modular device for controlling the interactive capabilities of an application executable on a computer, the device comprising:

a. circuitry for facilitating presentation, on the computer, of an interactive application thereon;

b. processing circuitry for storing and executing instructions implementing the application; and c. a housing adapted to receive physical tokens therein, the housing comprising circuitry responsive to the tokens and interactive with the processing circuitry so as to govern the executed instructions in a modular fashion dictated by the tokens, thereby determining the interactive capabilities of the application; and wherein the tokens are each in the form of a disc combinable with other such discs within the housing.

11. The device of claim 10 wherein each token comprises an optically readable indicium, the reading circuitry comprising an optical reader.

12. A method of implementing an interactive computer application, the method comprising:

a. providing a housing adapted to receive physical tokens therein;

b. introducing at least one physical token into the housing;

c. storing instructions implementing the application; and d. causing execution of the application on a computer in accordance with the instructions and responsive to the at least one token in the housing, the at least one token governing the executed instructions in a modular fashion and thereby determining the interactive capabilities of the application;

e. causing establishment of a network connection to a server; and f. downloading and storing instructions from the server via the network connection, the instructions downloaded from the server being determined by the at least one physical token and themselves determining the capabilities of the application; and further comprising the steps of providing a plurality of the tokens and stacking them within the housing, the stacked tokens collectively determining the instructions downloaded from the server.

13. The method of claim 12 wherein each token has a unique indicium assigned thereto and readable therefrom, the method further comprising the step of reading the indicia and communicating them to the server to determine the downloaded instructions.

14. A method of implementing an interactive computer application, the method comprising:

a. providing a housing adapted to receive physical tokens therein;

b. introducing at least one physical token into the housing;

c. storing instructions implementing the application; and d. causing execution of the application on a computer in accordance with the instructions and responsive to the at least one token in the housing, the at least one token governing the executed instructions in a modular fashion and thereby determining the interactive capabilities of the application;

wherein the at least one token is in the form of a disc stackable with other such discs within the housing; and wherein the tokens are in the form of discs having first and second faces and a surrounding edge, the edge of one of the tokens comprising a display, and further comprising the step of causing the display to impart an observable signal.

15. The method of claim 14 wherein the application causes presentation of an interactive game playable on the computer in accordance with the instructions, the signal being issued in the course of play.

* * * * *